US009295264B2

(12) United States Patent
Anderson et al.

(10) Patent No.: US 9,295,264 B2
(45) Date of Patent: Mar. 29, 2016

(54) DOUGH PREPARING MACHINE WITH DOUGH DIVIDING IN BOWL

(71) Applicants: Rick Anderson, Waterville, OH (US); Tim Hancock, Malinta, OH (US)

(72) Inventors: Rick Anderson, Waterville, OH (US); Tim Hancock, Malinta, OH (US)

(73) Assignee: Anderson Group, Ltd., Waterville, OH (US)

(*) Notice: Subject to any disclaimer, the term of this patent is extended or adjusted under 35 U.S.C. 154(b) by 449 days.

(21) Appl. No.: 13/734,503

(22) Filed: Jan. 4, 2013

(65) Prior Publication Data

US 2013/0176811 A1   Jul. 11, 2013

Related U.S. Application Data

(60) Provisional application No. 61/583,939, filed on Jan. 6, 2012.

(51) Int. Cl.
| | |
|---|---|
| *A21C 1/00* | (2006.01) |
| *A21C 1/02* | (2006.01) |
| *A21C 5/08* | (2006.01) |
| *B01F 7/00* | (2006.01) |
| *B01F 7/16* | (2006.01) |
| *B01F 9/16* | (2006.01) |

(52) U.S. Cl.
CPC . *A21C 1/003* (2013.01); *A21C 1/02* (2013.01); *A21C 5/08* (2013.01); *B01F 7/00408* (2013.01); *B01F 7/1615* (2013.01); *B01F 9/16* (2013.01)

(58) Field of Classification Search
CPC ............. A21C 1/02; A21C 1/04; A21C 1/003
USPC .................... 366/95, 201, 224, 227
See application file for complete search history.

(56) References Cited

U.S. PATENT DOCUMENTS

| | | | | | |
|---|---|---|---|---|---|
| 936,920 | A | * | 10/1909 | Meschini | 366/95 |
| 1,014,909 | A | * | 1/1912 | Schenk | 366/95 |
| 1,438,281 | A | * | 12/1922 | Westerman | 366/287 |
| 1,733,291 | A | * | 10/1929 | Aastrup | 366/98 |
| 1,733,945 | A | * | 10/1929 | Dehuff | 366/207 |
| 2,012,214 | A | * | 8/1935 | Aeschbach | 366/94 |
| 2,099,937 | A | | 11/1937 | Lauterbur | |

(Continued)

FOREIGN PATENT DOCUMENTS

| | | |
|---|---|---|
| DE | 1290 C | 12/1877 |
| WO | 2010048487 A2 | 4/2010 |

OTHER PUBLICATIONS

WIPO, International Search Report, PCT/US2013/020296, Apr. 5, 2013.

(Continued)

*Primary Examiner* — David Sorkin
*Assistant Examiner* — Abbas Rashid
(74) *Attorney, Agent, or Firm* — Dinsmore & Shohl LLP

(57) ABSTRACT

A dough preparing machine operable to mix and divide dough so as to form a plurality of individual loaves of bread in a relatively compact space is provided. The dough preparing machine includes a compressing and dividing device, a bowl, a pivotable mixing arm, a rounder, and a sheeter molder. The dough preparing machine further includes a transfer device having a first arm and an opposable gripper operable to handle the rounded individual balls of dough. The compressing and dividing device configured to press the dough uniformly within the bowl, and divide the compressed dough into individual balls of dough.

17 Claims, 7 Drawing Sheets

(56) References Cited

U.S. PATENT DOCUMENTS

| | | | | |
|---|---|---|---|---|
| 2,177,600 | A | * | 10/1939 | Schmidt ..................... 241/199.6 |
| 2,339,439 | A | * | 1/1944 | Tone ............................. 366/200 |
| 2,370,888 | A | | 3/1945 | Sticelber |
| 2,525,585 | A | * | 10/1950 | Brasington .................. 366/222 |
| 3,881,404 | A | | 5/1975 | Ohkawa |
| 3,928,646 | A | | 12/1975 | Hartley |
| 4,375,336 | A | * | 3/1983 | Halley ............................ 366/77 |
| 4,438,146 | A | | 3/1984 | Colby et al. |
| 4,490,046 | A | | 12/1984 | Guibert |
| 4,501,757 | A | | 2/1985 | Smith et al. |
| 4,765,746 | A | * | 8/1988 | Suay Puig ....................... 366/77 |
| 4,919,539 | A | * | 4/1990 | Drocco ............................ 366/94 |
| 5,171,590 | A | | 12/1992 | Sluimer |
| 5,272,962 | A | | 12/1993 | Kageyama et al. |
| 5,482,366 | A | * | 1/1996 | Konig et al. ..................... 366/97 |
| 5,735,190 | A | * | 4/1998 | Sham .............................. 99/327 |
| 5,895,196 | A | | 4/1999 | Forsyth |
| 5,895,668 | A | * | 4/1999 | Willett .......................... 425/148 |
| 6,503,550 | B1 | | 1/2003 | Suganuma et al. |
| 6,997,597 | B2 | * | 2/2006 | Drocco ............................ 366/94 |
| 7,328,652 | B2 | | 2/2008 | McNamee |
| 7,866,877 | B2 | | 1/2011 | Fay et al. |
| 8,409,648 | B2 | | 4/2013 | Anderson et al. |
| 2003/0167931 | A1 | * | 9/2003 | Mazza et al. .................... 99/348 |
| 2004/0028767 | A1 | | 2/2004 | McNamee |
| 2004/0213078 | A1 | * | 10/2004 | Drocco ............................ 366/94 |
| 2007/0171766 | A1 | * | 7/2007 | Loiselet .......................... 366/92 |
| 2008/0151682 | A1 | | 6/2008 | Fay et al. |
| 2008/0193618 | A1 | | 8/2008 | Guinard et al. |
| 2009/0067279 | A1 | | 3/2009 | Mulle et al. |
| 2009/0161478 | A1 | | 6/2009 | Gustafson et al. |
| 2009/0220643 | A1 | | 9/2009 | Kato |
| 2010/0085832 | A1 | | 4/2010 | Wells |
| 2011/0059211 | A1 | | 3/2011 | Chandi et al. |
| 2011/0075506 | A1 | | 3/2011 | Kafer et al. |
| 2011/0203463 | A1 | | 8/2011 | Anderson et al. |

OTHER PUBLICATIONS

U.S. Appl. No. 61/107,736, filed Oct. 23, 2008, entitled Dough Preparing System.

* cited by examiner

US 9,295,264 B2

DOUGH PREPARING MACHINE WITH DOUGH DIVIDING IN BOWL

CROSS-REFERENCE TO RELATED APPLICATIONS

This application claims the benefit of U.S. Provisional Application 61/583,939 filed on Jan. 6, 2012, the contents of which are incorporated herein by reference in its entirety.

FIELD OF THE INVENTION

A dough preparing machine operable to prepare and divide the dough within a mixing bowl is provided.

DESCRIPTION OF THE PRIOR ART

Dough preparation is labor intensive and requires numerous steps. The steps for preparing dough for baking are relatively simple: gather the proper ingredients, mix the ingredients to a desired consistency, divide the mixed dough, round and mold the divided dough, and proof the dough.

Dough preparation remains very much an artisan skill because the handling and cutting of dough is done by an individual so as to ensure the consistency of the dough is optimal for baking. Further, dough is sticky and thus handling of individual balls of dough requires finesse.

Automated machines for forming individual loaves of dough from a batch of ingredients are known. In particular, dough preparation machines wherein the dough is pressed within a mixing bowl are known. However, current machines are only operable to form one individual ball of dough at a time. Thus, such systems are not sufficient or suitable for mass production of dough.

Accordingly, it remains desirable to have a dough preparing machine operable to form multiple balls of dough in a single operation so as to facilitate the mass production of dough yet maintain the dough in a uniform and desired consistency, and provide dough having a desired tactile property.

SUMMARY OF THE INVENTION

A dough preparing machine operable to mix and divide dough so as to form a plurality of individual loaves of bread in a relatively compact space is provided. The dough preparing machine includes a compressing and dividing device, a bowl, a pivotable mixing arm, a rounder, and a sheeter molder. The dough preparing machine further includes a transfer device having a first arm and an opposable gripper operable to handle the rounded individual balls of dough.

BRIEF DESCRIPTION OF THE DRAWING

With reference first to FIG. 1, a dough preparing machine of the present invention is provided.

DETAILED DESCRIPTION OF THE INVENTION

Figure 1:
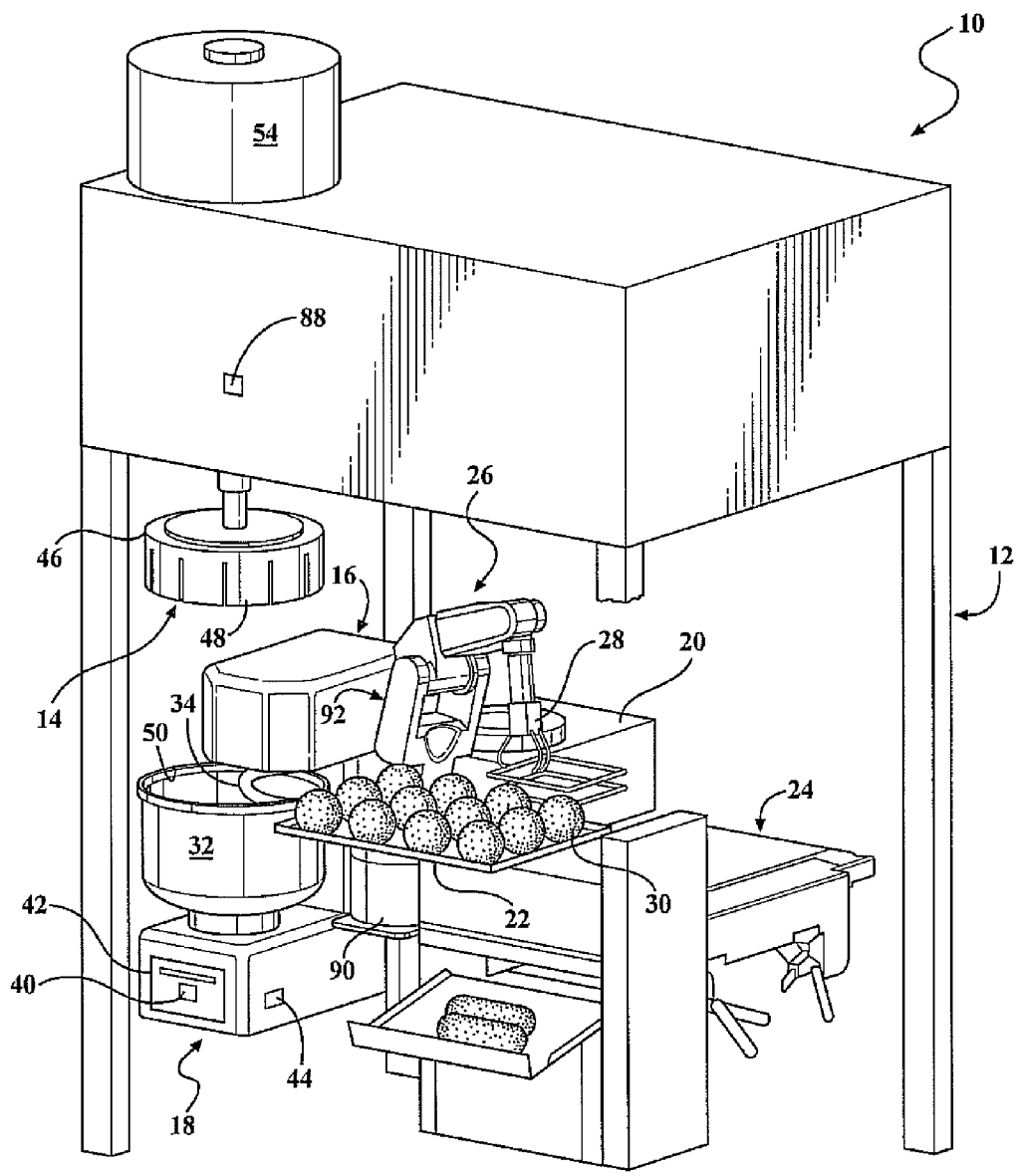
Figure 2:
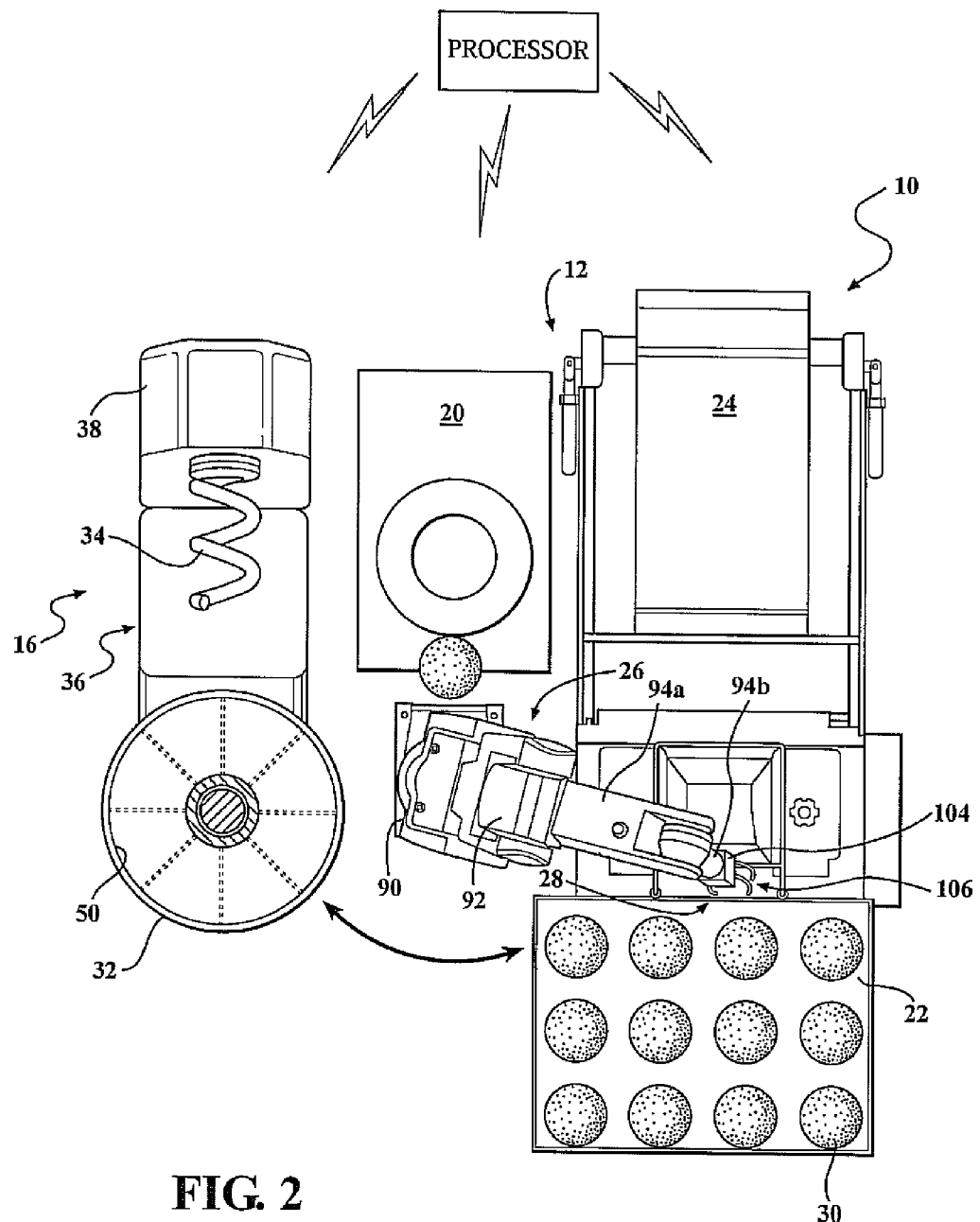
FIG. 2 is a top down view of the dough preparing machine of FIG. 1.
Figure 3:
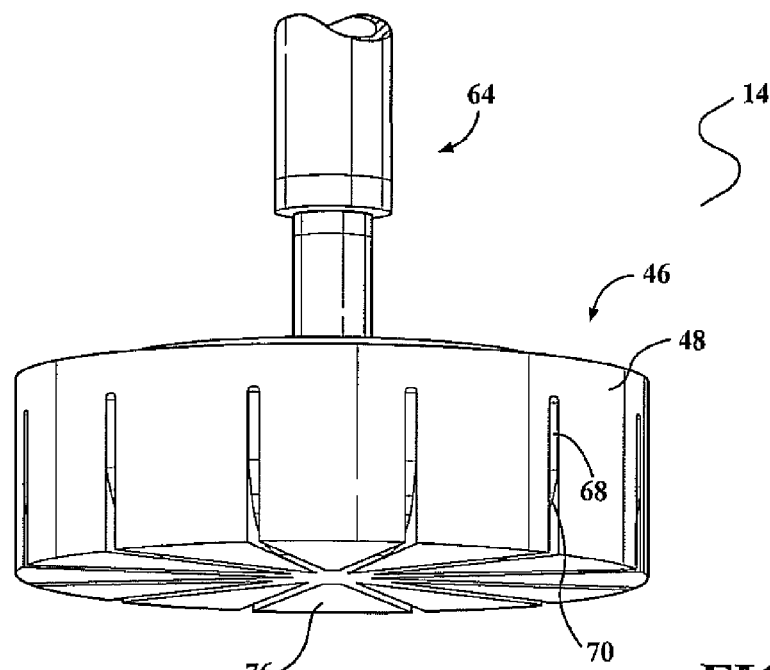
FIG. 3 is an isolated view of the compressing and dividing device showing the dividers nestled within the compression plate.
Figure 4:
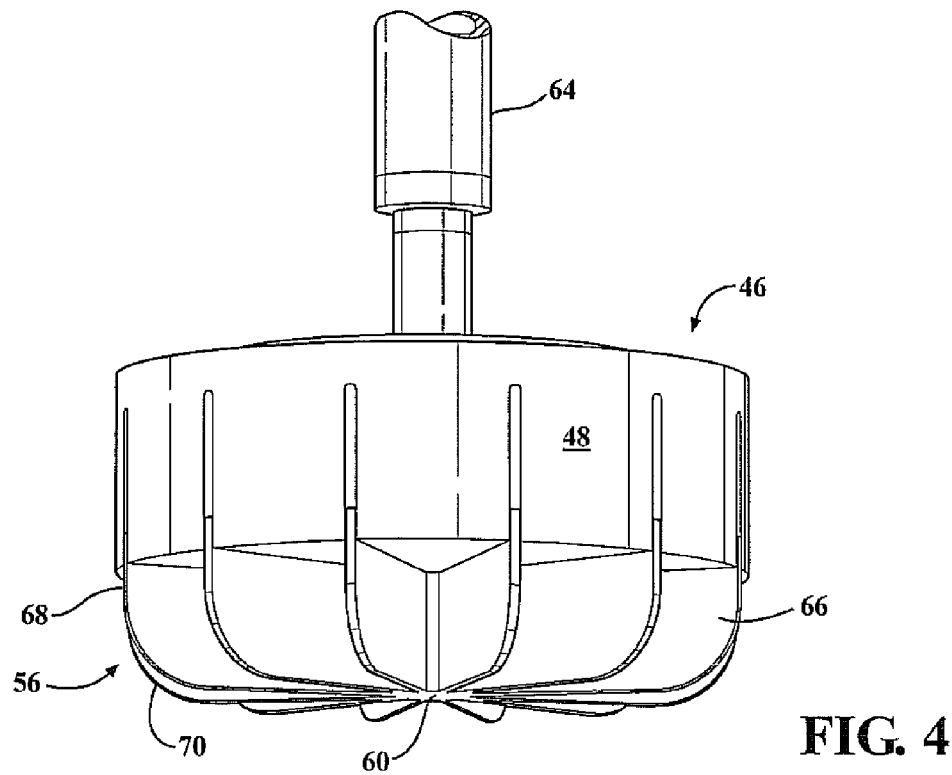
FIG. 4 is a view of FIG. 3 showing the dividing blades extended beyond the compressing plate.

With reference first to FIGS. 1 and 2, a dough preparing machine 10 of the present invention is provided. The dough preparing machine 10 includes a frame 12 for supporting components. The components may include a compressing and dividing device 14, a mixing assembly 16 mounted onto a base 18, a rounder 20, a rest plate 22, a sheeter molder 24, and a transfer device 26.

The transfer device 26 is mounted to the frame 12. The transfer device 26 includes a gripper 28 configured to move formed balls of dough 30 between different components of the dough preparing machine 10. In one embodiment, the transfer device 26 picks up individual balls of dough 30 and transfer the individual balls of dough 30 from the bowl 32 to the rounder 20, and from the rounder 20 to the rest plate 22, and the rest plate 22 to the sheeter molder 24 It should be appreciated that the term "ball of dough" is descriptive and not limiting to the dimension of the dough, but is more directed to a piece of dough formed by the division of a batch of dough within the bowl 32.

The mixing assembly 16 includes a mixing bowl 32 and a mixing arm 34. The mixing bowl 32 is rotatably mounted to the base 18. The mixing bowl 32 may be formed of a durable and rigid material having a relatively slick surface such as stainless steel. The mixing bowl 32 may be fixedly or detachably mounted to the base 18.

The mixing arm 34 is pivotally mounted to the base 18 so as to pivot along a plane generally orthogonal to a horizontal surface of the base 18. As shown in FIG. 2, the mixing arm 34 is pivoted up and away from the bowl 32 so as to be clear of the opening of the mixing bowl 32. The compressing and dividing device 14 is disposed above the opening of the mixing bowl 32 and the mixing arm 34. The mixing arm 34 is pivoted so as to allow the compressing and dividing device 14 clear passage to the opening of the mixing bowl 32.

The rounder 20 is shown located between the mixing assembly 16 and the sheeter molder 24. However, it should be appreciated that the rounder 20 may be disposed in other locations within the frame 12 so as to accommodate a designed space. The divided dough may be placed into the rounder 20 so as to form the individual divided pieces of dough into balls of dough 30 as shown in FIGS. 1 and 2. The balls of dough 30 are then placed on the rest plate 22 and then individually dropped into the sheeter molder 24 where they are formed into loaves as shown in FIG. 1.

The Mixing Assembly 16

The mixing assembly 16 includes a stand 36 having a mixing arm housing 38. The mixing arm housing 38 is configured to hold a drive (not shown) operable to rotate the mixing bowl 32. The mixing assembly 16 further includes a mixing arm 34 extending downwardly from a mixing arm housing 38. The mixing arm housing 38 is configured to hold a drive (not shown) configured to rotate the mixing arm 34 about an axis. The drive may rotate the mixing arm 34 in both a clockwise direction and counter-clockwise direction. The mixing arm 34 may be a spiral shaped member. It should be appreciated that any mixing arm 34 currently known and used may be adaptable for use herein illustratively including a dual armed mixer. The mixing arm 34 is pivotably attached to the stand 36.

With reference first to FIG. 1, the mixing arm 34 is shown disposed within the opening of the mixing bowl 32. With reference now to FIG. 2, the mixing arm 34 is shown pivoted away from the mixing bowl 32 so as to be free and clear of the opening of the mixing bowl 32. More specifically, the mixing bowl 32 may be rotated about an axis centered on and orthogonal to the base 18 and the mixing arm 34 is pivoted along a plane which is generally vertical.

Dry and wet ingredients for mixing the dough are poured into the mixing bowl 32 and the mixing arm 34 is pivoted downwardly so as to be disposed within the bowl 32. The mixing arm 34 is subsequently actuated so as to mix the wet and dry ingredients therein. The mixing bowl 32 may also be actuated so as to rotate in a direction opposite the rotation of the mixing arm 34.

The dough preparing machine 10 may include a processor 40 operable to execute a plurality of predetermined functions. The dough preparing machine 10 may further include an input 42. The input 42 may be a digital touch screen presenting a plurality of menu items. It should be appreciated that the input 42 need not be located on the base of the stand 40, and need not necessarily be incorporated into any of the components shown. For instance, the input 42 may be a stand-alone unit. One of the menu items may be directed towards recipes for various batches of dough, and each recipe may have associated therewith a mixing sequence 44. As used herein, a mixing sequence 44 is a program configured to rotate the mixing arm 34 and the bowl 32 in a predetermined manner. It should be appreciated that the dough preparing machine 10 may include a plurality of mixing sequences 44. Thus, upon selection of a recipe, the input 42 transmits the selected recipe to the processor 40. The display may provide the user with directions as to the ingredients, and rotate the mixing arm 34 and bowl 32 in a predetermined sequence when the user selects wheat bread as opposed to sour dough bread.

The mixing sequences 44 may be directed towards achieving a desired dough consistency based upon the ingredients used to make the dough. The mixing time may be based upon the ingredients used to form the dough and may be an established period of time commensurate with the time it takes to achieve a desired consistency. For example, in instances where the dough preparing machine 10 is preparing wheat bread, the mixing arm 34 may be actuated for a longer period of time than when the dough preparing machine 10 is preparing a batch of white bread. Other parameters may be used to establish the mixing time such as the volume of ingredients being used, the desired consistency of the dough to be achieved, or the like. Once the mixing sequence 44 is fully executed, the mixing arm 34 is stopped and is pivoted away from the bowl 32.

The dough preparing machine 10 may further include a finishing sequence to help remove all of the dough from the mixing arm 34. For instance, the bowl 32 may be rotated opposite the rotation of the mixing arm 34 so as to help free dough from the mixing arm 34. Other finishing sequences may be used based upon the quality of the dough such as consistency, weight, and the like. The sequences may be programmed into a processing unit. An input 42 may be actuated by a user to select anyone of the sequences for operation.

Dough Compressing and Dividing Device 14

With reference now to FIGS. 3-8, a dough compressing and dividing device 14 is provided. The dough compressing and dividing device 14 includes a press block 46. The press block 46 may be formed of durable and rigid material operable to maintain its form under predetermined pressures. Such materials include plastic or a metal composite. The outer surface of the press block 46 may be treated with a substance operable to prevent the dough from sticking to press block 46, such as food grade mineral oil.

Figure 7:
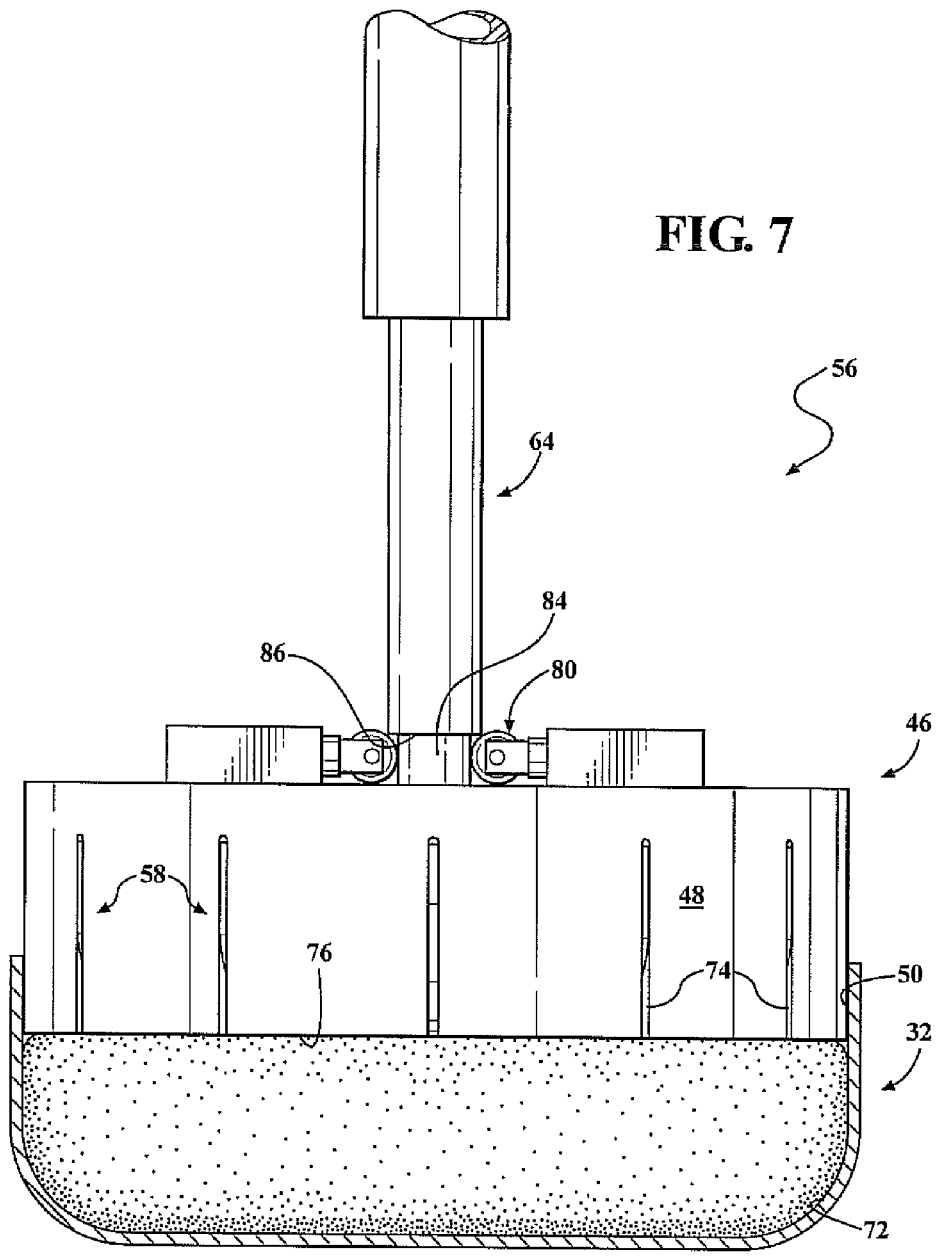
FIG. 7 is a view of FIG. 6 showing the dividing and compressing device compressing the dough uniformly through the bottom portion of the bowl.
Figure 8:
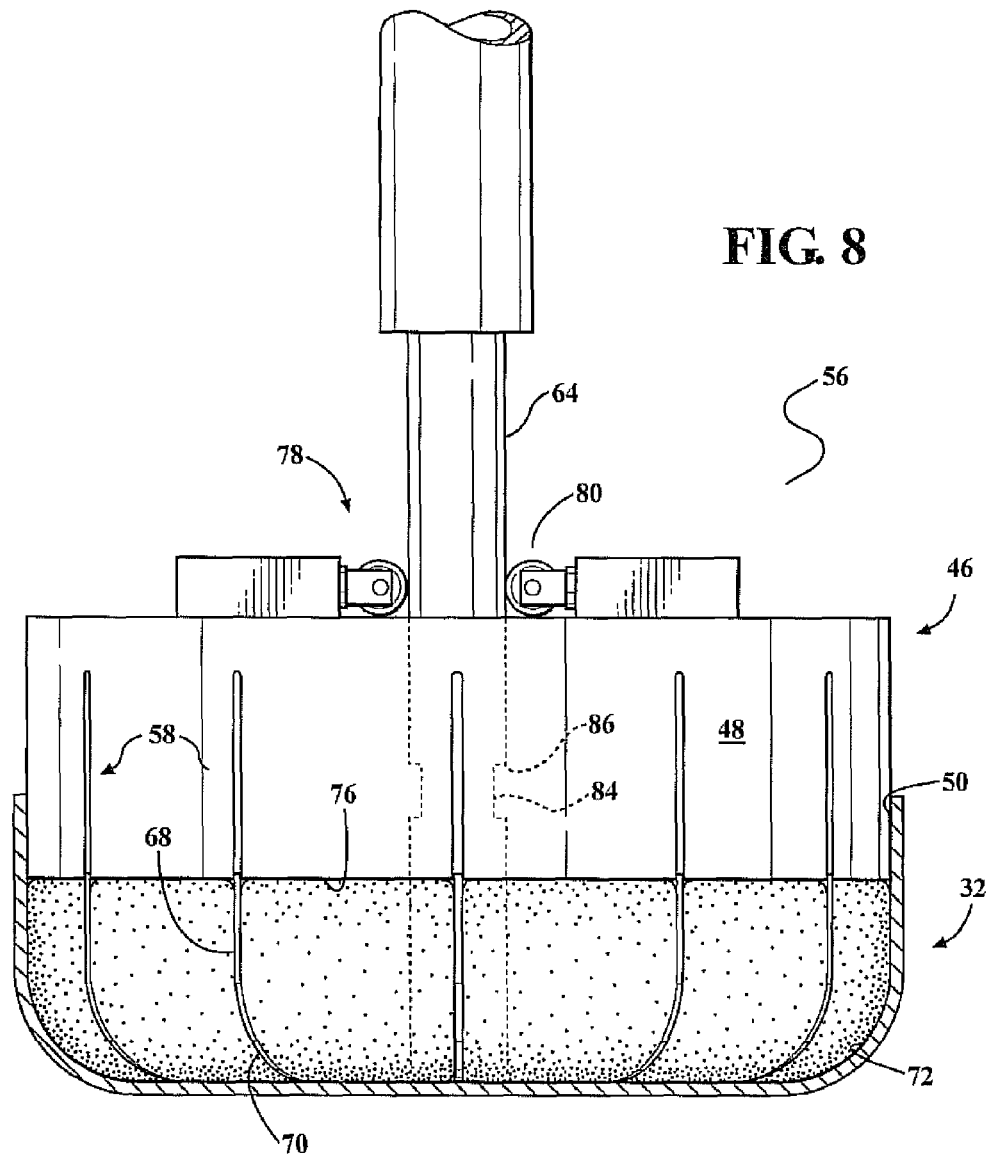
FIG. 8 is a view of FIG. 7 showing the dividing and compressing device dividing the compressed dough.

The press block 46 has an outer edge 48. The outer edge 48 is adapted to slidingly fit within the inner surface walls 50 of the mixing bowl 32. It should be appreciated that there may be some clearance between the outer edge 48 and the inner surface wall 50 of the mixing bawl 32, however the dimension of the outer edge 48 with respect to the inner surface wall 50 of the mixing bowl 32 is such that dough is prevented from spreading upwardly between the inner surface wall 50 and the outer edge 48 during pressing operations. Alternatively, as shown in FIG. 7, the outer edge 48 of the press block 46 may be in contact with the inner surface wall 50 of the sides of the bowl 32. Thus, as the bottom surface of the press block 46 presses the dough, the dough is not able to squeeze between the outer edge 48 of the press block 46 and the inner surface walls 50 of the mixing bowl 32. The press block 46 includes an aperture 52 generally centered in the middle of the press block 46. A press drive 54, such as a hydraulic, pneumatic, or electric press cylinder 54 is configured to drive the press block 46 up and down. A distal end of the press drive 54 is disposed within the aperture 52.

The compressing and dividing device 14 further includes a divider blade assembly 56. The divider blade assembly 56 includes a plurality of blades 58. The blades 58 extend radially from a center point. For instance, the blades 58 extend radially from a collar 60. The collar 60 includes a through hole 62 adapted to fit a shaft 64 fixedly mounted to the collar 60 so as to drive the blades 58 downwardly into the dough so as to divide the dough. The blades 58 are angled at equal angles with respect to each to each other, so as to be evenly spaced apart. Thus, the batch dough is divided into generally equal parts. The blades 58 have a planar surface 66 and a blade edge 68. The blade edge 68 has a side portion 70 which is generally curved so as to fittingly engage an inner bottom surface of the mixing bowl 32, as generally shown in FIGS. 4-8. As illustratively shown, the inner wall surface of the bowl 32 is arcuate along the bottom, and the side portion 70 of each of the blades 58 is dimensioned so as to follow the arcuate inner wall surface 72 along the bottom of the bowl 32.

Figure 6:
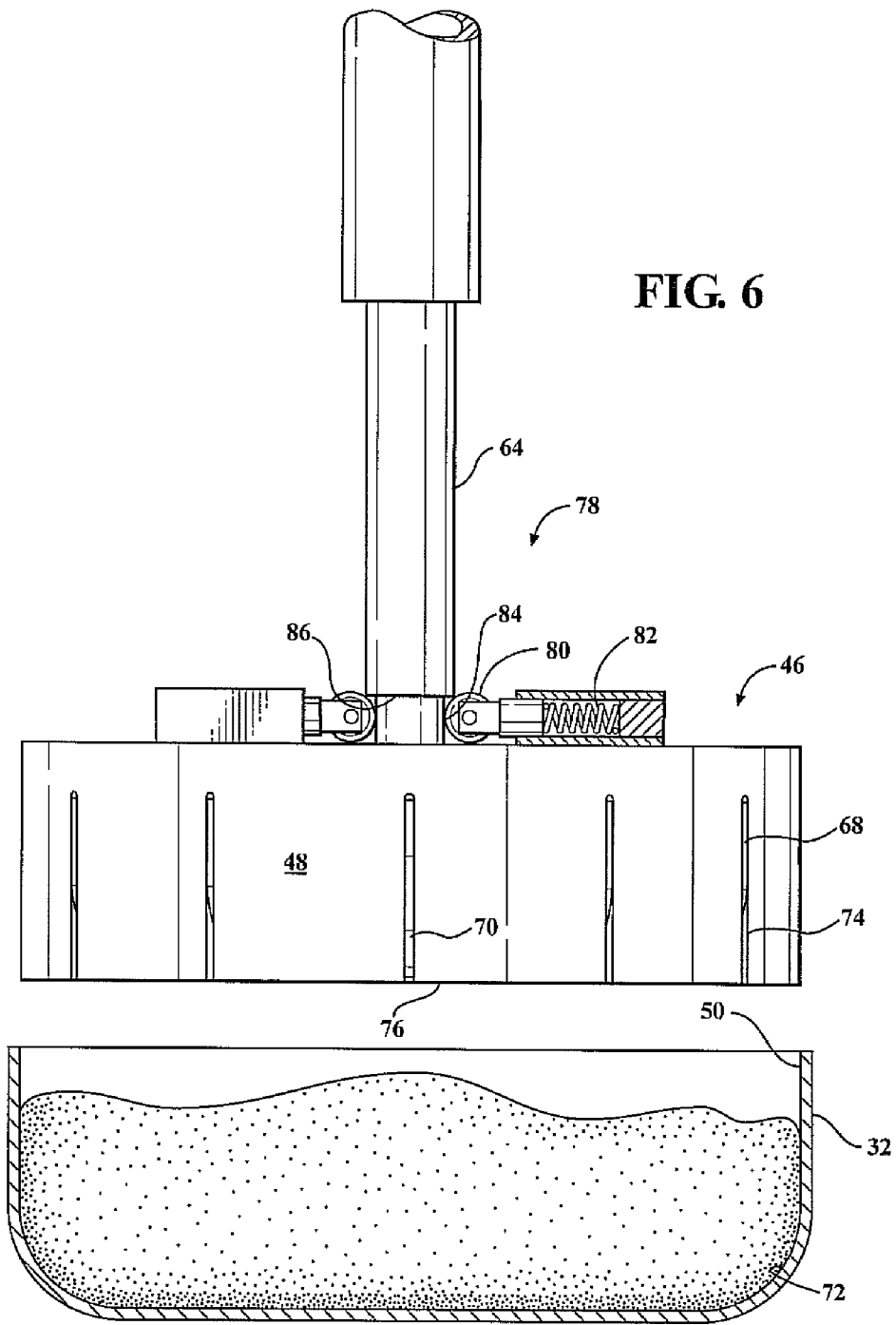
FIG. 6 is a view of the compressing and dividing device above a bowl having dough, wherein the dough presents an uneven top surface.

The press block 46 includes a plurality of slits 74. The slits 74 are configured to receive the blades 58. More specifically, the slits 74 are configured and oriented within the body of the press block 46 so as to house the blades 58 within press block 46, wherein the under surface 76 of the press block 46 presents a generally planar under surface 76 conducive to pressing operations. As seen in FIGS. 6 and 7, the bottom surface of the blade edge 68 is flush with under surface 76 of the press block 46.

The shaft 64 is adapted to be fixedly couple with the hydraulic or electric press cylinder 54. The press cylinder 54 is operable to move in an up-down motion relative to the mixing bowl 32. As shown in FIG. 1, the compressing and dividing device 14 is disposed generally above the mixing bowl 32 and aligned so as to engage the outer edge 48 of the press block 46 with the inner surface wall 50 of the mixing bowl 32. The press cylinder 54 is positioned so as to drive the shaft 64 along an axis centered on the middle of the bowl 32.

The compressing and dividing device 14 includes a mechanical coupler 78. The mechanical coupler 78 is configured to hold the blades 58 within the slits 74 during dough pressing operations, and release the blades 58 from the slits 74 to perform dough dividing operations. It should be appreciated that the mechanical coupler 78 provided herein is illustrative and not limiting.

Figure 5:
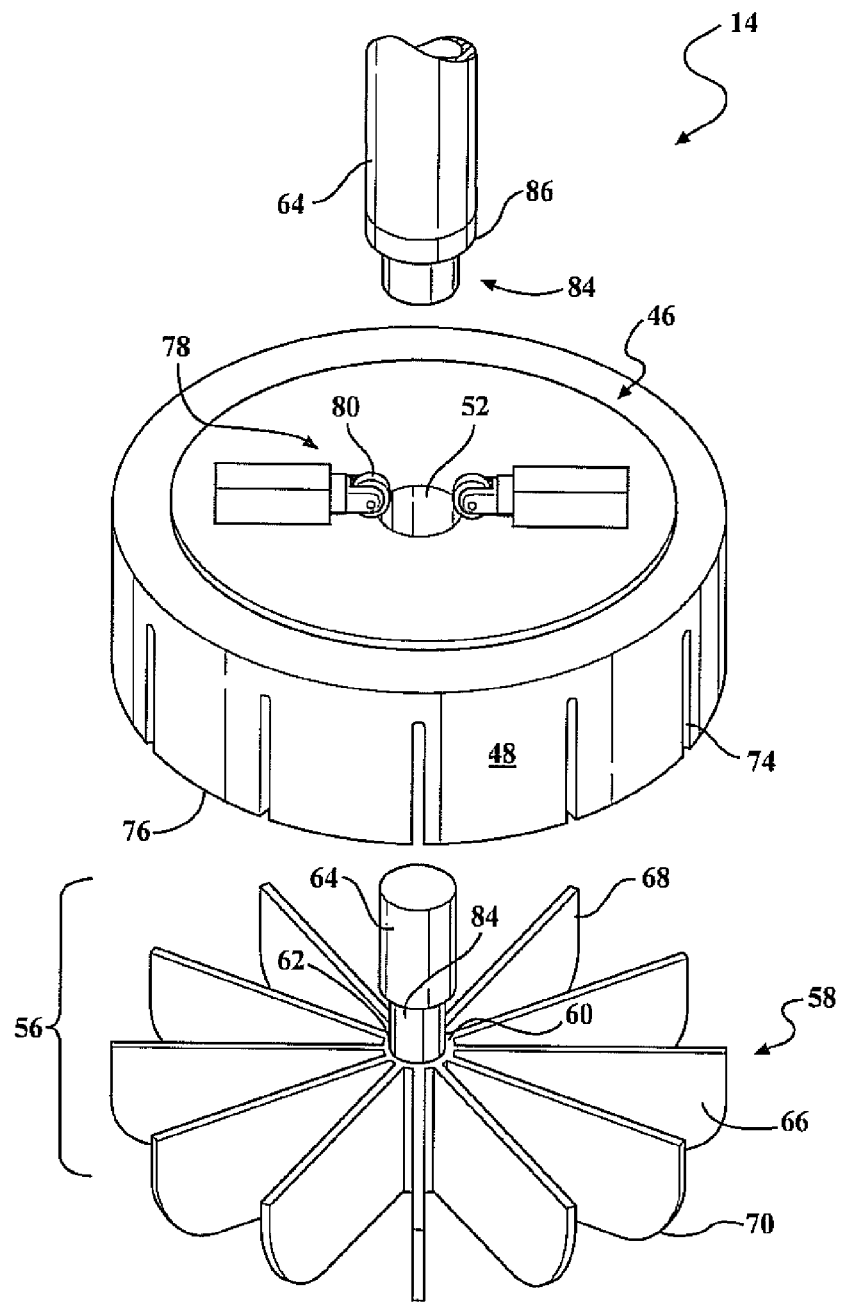
FIG. 5 is an exploded view of the compressing and dividing device.

An illustrative embodiment of the mechanical coupler 78 is provided in FIGS. 5-7. The mechanical coupler 78 is spring loaded and includes rollers 80 which are mounted to a top surface of the press block 46. The mechanical coupler 78 includes a pair of biasing members 82, each operatively connected to a respective roller 80. The biasing members 82 are operative to urge the rollers 80 against the shaft 64. Specifically, the biasing members 82 are operative to urge the rollers 80 into a detent 84 formed on the outer surface of the shaft 64. Thus, the rollers 80 lock the divider blade assembly 56 with respect to the slits 74 until a predetermined pressure is placed upon the shaft 64. As the rollers 80 fix the blades 58 within the slit 74, the press block 46 presents a uniformly flat bottom surface configured to compress the dough within the mixing bowl 32. Preferably, the press block 46 exerts sufficient pressure on the dough so as to spread the dough uniformly throughout the bottom of the bowl 32. As the press cylinder 54 continues to exert downward pressure onto the pressed dough, the top notch portion 86 of the detent 84 also pushes against each respective roller 80, wherein sufficient downward pressure of the shaft 64 urges the rollers 80 away from the detent 84.

Upon experience of the predetermined pressure, the rollers 80 are biased away from the detent 84, so as to allow the press cylinder 54 to drive the blades 58 downward and out of the slits 74. Thus, the shaft 64 is pushed further downward, through the aperture 52 driving the blades 58 into the compressed dough and dividing the dough into multiple pieces of dough within the bowl 32.

The dough preparing machine 10 may include a second sensor 88 operable to detect the pressure of the blades 58 against the inner surface of the bowl 32. The second sensor 88 transmits a signal to the processor 40 when the blades 58 reach the bottom surface of the bowl 32, and the processor 40 then initiates a sequence to drive the press cylinder 54 upwardly. As the blades 58 are driven upwardly, the weight of the press block 46 keeps the divided dough within the bowl 32. The shaft 64 continues upwardly until the rollers 80 are engaged with the detent 84 formed along the outer surface of the shaft 64. The blades 58 are then fully housed within the slits 74 of the press block 46, and the rollers 80 are pressed against the detent 84, locking the press block 46 and the blades 58 together as unit so as to place the compressing and dividing device 14 in a configuration ready for another sequence of operation.

In operation the compressing and dividing device 14 is operable to move between a ready position and a use position. In the ready position the divider blade assembly 56 is housed within the slits 74 of the press block 46, and press block 46 and the blades 58 are disposed above the mixing arm 34 as shown in FIGS. 1 and 6. Thus, a user may add the desired ingredients and select a mixing function.

The mixing arm 34 will initiate a mixing sequence 44 selected by the user. As the mixing arm 34 completes its selected function, the mixing arm 34 and the bowl 32 may be rotated in pulses in different directions so as to facilitate the removal of dough from the mixing arm 34. Upon completion of the finishing sequence, the processor 40 may be further operable to pivot the mixing arm 34 away from the opening of the bowl 32. The processor 40 is then able to actuate the compressing and dividing device 14 so as to move the press block 46 downwardly into the opening of the bowl 32.

Specifically, the press block 46 is moved along an axis wherein the outer edge 48 of the press block 46 slides up against the inner surface walls 50 of the mixing bowl 32. As the press cylinder 54 moves the press block 46 to the use position, the under surface 76 of the press block 46 presses the dough within the mixing bowl 32. It should be appreciated that the divider blades 58 are housed within the slits 74 of the press block 46 so as to form a generally planar under surface 76 as shown in FIG. 6.

As the press block 46 is driven downward by the hydraulic cylinder, the bottom surface of the press block 46 pushes against the top surface of the dough. Thus, the dough is spread out uniformly along the lower surface of the mixing bowl 32 as shown in FIG. 7. The hydraulic cylinder continues to exert a downward pressure on the dough, as the dough spreads throughout the bowl, the dough presents a block, and the pressure is translated against the upper notch of the detent 84. The hydraulic cylinder continues to exert pressure until the notch of the detent 84 exerts sufficient pressure against the rollers 80 to overcome the pressure of the biasing members 82. In such a manner, the rollers 80 are pushed away from the detent 84 as shown in FIG. 7. When the rollers 80 are clear of the detent 84, the press cylinder 54 is operable to drive the shaft 64 through the aperture 52. As the distal end of the shaft 64 is fixedly mounted to the collar 60, the press cylinder 54 pushes the divider blade assembly 56 past the under surface 76 of the press block 46 as shown in FIG. 7. The blades 58 then divide the dough into equal and discrete portions of dough.

When the blades 58 are driven all the way down to the bottom of the bowl 32, the processor 40 then actuates the press cylinder 54 so as to move the divider blades 58 upwardly away from the inner bottom surface of bowl 32. The weight of the press block 46 keeps the divided dough within the bowl 32. The detent 84 of the shaft 64 is moved upward with respect to the rollers 80. The biasing members 82 urge the rollers 80 against the shaft 64, and into the detent 84. Thus, the blades 58 are fixed within the slits 74. The press block 46 and the blades 58 are moved together as a single unit up to the ready position as a whole unit, wherein the blades 58 are housed within the slits 74.

The Transfer Device 26

With reference again to FIGS. 1 and 2 an illustrative view of an embodiment of the transfer device 26 is provided. The transfer device 26 includes a transfer base 90 and a drive (not shown) operable to rotate an arm 92. The arm 92 includes a plurality of segments 94 pivotably attached to each other so as to allow the segments 94 to extend and contract with respect to the transfer base 90. The Figures show the arm 92 having two segments 94a, 94b. Segment 94a is pivotably attached to the transfer base 90. Segment 94b is pivotably attached to a distal end of segment 94a. The distal end of segment 94b includes a gripper 28 operable to grab and release a ball of dough.

The transfer device 26 is mounted centrally to the frame 12 of the dough processing machine and is operable to move the gripper 28 in three-dimensional space, as indicated by the arrow shown in FIG. 12. Thus, the segments 94 may be extended or retracted, and pivoted so as to place the grippers 28 in position to grab dough and deposit dough from one station to the next.

The gripper 28 may include first, second and third gripping members 28a, 28b, 28c which may be displaced relatively to and from each other so as to mimic the motion of the fingers of a human hand. The second and third gripping members 28b, 28c are fixed relative to each other and angled away from each other. The second and third gripping members 28b, 28c may be pivoted to and from the first gripping member 28*a*. Each gripping member 28*a*, 28*b*, 28*c* includes a curved shaped portion operable to assist in grabbing dough. The gripping members 28*a*, 28*b*, 28*c* may include a padded surface 96 operable to handle the tacky dough.

The gripper 28 is moved within the bowl 32 and the gripping members 28*a*, 28*b*, 28*c* are actuated so as to grab each of the discrete portions of dough and place them within the rounder 20. The gripper 28 is further operable to move rounded balls of dough 30 onto the rest plate 22 and the rounded balls of dough 30 from the rest plate 22 onto the sheeter molder 24 where the rounded balls of dough 30 are molded into loaves.

The Rounder 20

The rounder 20 may be positioned between the mixing assembly 16 and the sheeter molder 24. Rounders are currently known and used in the art, and any rounder 20 currently known and used in the art may be adaptable for use herein to include a screw rounder 20 as shown in FIG. 2. The screw rounder 20 includes a turn screw generally centered along a cylindrical container. The elongated cylindrical container may be rotated about the stationary screw so as to form each ball of dough 30 into the shape of a ball as shown in FIG. 1.

Obviously, many modifications and variations of the present invention are possible in light of the above teachings and may be practiced otherwise than as specifically described. In addition, the reference numerals in the specification are merely for convenience and are not to be read in any way as limiting.

What is claimed is:

1. A dough preparing machine operable to produce a predetermined number of individual balls of dough from a batch of dough, the dough preparing machine comprising:
   a frame;
   a bowl having an inner surface wall defining an opening, the bowl rotatably mounted to the frame;
   a mixing assembly, having a mixing arm configured to rotate along an axis; the mixing arm pivotably mounted to the frame, and further configured to be pivoted away from the opening of the bowl; and
   a compressing and dividing device having an under surface, the under surface having an outer edge bounding an area the same size as the opening of the bowl so as to slidingly engage the entire opening of the bowl at once, wherein the under surface presses a batch of dough uniformly against the inner surface wall of the bowl, the compressing and dividing device further configured to divide the compressed batch of dough into individual balls of dough, wherein each individual ball of dough is approximately the same size as the other.

2. The dough preparing machine as set forth in claim 1, further including a rounder, a rest plate, a sheeter molder, and a transfer device all of which are mounted to the frame, the transfer device configured to pick up individual balls of dough and transfer the individual balls of dough from the bowl to the rounder, and from the rounder to the rest plate, and the rest plate to the sheeter molder.

3. The dough preparing machine as set forth in claim 2, wherein the compressing and dividing device includes a press block and a divider blade assembly, the divider blade assembly including a plurality of blades, the press block including a plurality of slits, each of the plurality of slits is configured to house a respective one of the plurality of blades, the compressing and dividing device configured to retain the plurality of blades within the slits so as to present a generally planar bottom surface to compress the batch of dough, and release the plurality of blades from the press block so as to divide the batch of dough into discrete balls of dough.

4. The dough preparing machine as set forth in claim 3, wherein the dough machine further includes a drive configured to urge the compressing and dividing device into the bowl.

5. The dough preparing machine as set forth in claim 4, wherein the divider blade assembly further includes a shaft fixedly mounted to the drive, and a collar fixedly mounted to the shaft, the blades extending radially from the collar, each of the plurality of blades spaced evenly apart from each other so as to divide the batch of dough into equally sized individual balls of dough.

6. The dough preparing machine as set forth in claim 5, further including a mechanical coupler, the mechanical coupler configured to lock the blades within the slits, and release the blades from the slits when the press block experiences a predetermined pressure.

7. The dough preparing machine as set forth in claim 6, wherein the shaft includes a detent, and the mechanical coupler includes a pair of rollers and a pair of biasing members configured to urge each of the rollers against the detent so as to lock the blades within the slits of the press block.

8. The dough preparing machine as set forth in claim 7, wherein the pair of rollers are mounted to a top surface of the press block.

9. The dough preparing machine as set forth in claim 1, further including a processor and an input, the input configured to select one of a plurality of mixing sequences, wherein each of the plurality of mixing sequences is a program configured to rotate the mixing arm and the bowl in a predetermined manner, the processor configured to receive the selected mixing sequences so as to actuate the mixing arm and bowl in accordance with the selected mixing sequence.

10. A dough preparing machine operable to produce a predetermined number of individual balls of dough from a batch of dough, the dough preparing machine comprising:
    a bowl rotatably mounted to a base, the bowl having an inner surface wall defining an opening; and
    a compressing and dividing device having an under surface, the under surface having an outer edge bounding an area the same size as the opening of the bowl so as to slidingly engage the entire opening of the bowl at once, wherein the under surface presses a batch of dough uniformly against the inner surface wall of the bowl, the compressing and dividing device further configured to divide the compressed batch of dough into individual balls of dough, wherein each individual ball of dough is approximately the same size as the other.

11. The dough preparing machine as set forth in claim 10, wherein the compressing and dividing device includes a press block and a divider blade assembly, the divider blade assembly including a plurality of blades, the press block including a plurality of slits, each of the plurality of slits is configured to house a respective one of the plurality of blades, the compressing and dividing device configured to retain the plurality of blades within the slits so as to present a generally planar bottom surface to compress the batch of dough, and release the plurality of blades from the press block so as to divide the batch of dough into discrete balls of dough.

12. The dough preparing machine as set forth in claim 11, wherein the dough machine further includes a drive configured to urge the compressing and dividing device into the bowl.

13. The dough preparing machine as set forth in claim 11, wherein the inner wall surface of the bowl is arcuate along the bottom, and wherein a bottom edge of each of the blades is dimensioned so as to follow the arcuate inner wall surface along the bottom of the bowl.

14. The dough preparing machine as set forth in claim 12, wherein the divider blade assembly further includes a shaft fixedly mounted to the drive, and a collar fixedly mounted to the shaft, the blades extending radially from the collar, each of the plurality of blades spaced evenly apart from each other so as to divide the batch of dough into equally sized individual balls of dough.

15. The dough preparing machine as set forth in claim 14, further including a mechanical coupler, the mechanical coupler configured to lock the blades within the slits, and release the blades from the slits when the press block experiences a predetermined pressure.

16. The dough preparing machine as set forth in claim 15, wherein the shaft includes a detent, and the mechanical coupler includes a pair of rollers and a pair of biasing members configured to urge each of the rollers against the detent so as to lock the blades within the slits of the press block.

17. The dough preparing machine as set forth in claim 15, wherein the pair of rollers are mounted to a top surface of the press block.

\* \* \* \* \*